United States Patent [19]

Hawkinson

[11] 4,168,012
[45] Sep. 18, 1979

[54] FUEL CAP ASSEMBLY

[75] Inventor: Jack W. Hawkinson, Galesburg, Ill.

[73] Assignee: Outboard Marine Corporation, Waukegan, Ill.

[21] Appl. No.: 910,574

[22] Filed: May 30, 1978

[51] Int. Cl.² .............................................. B65D 51/16
[52] U.S. Cl. .................... 220/209; 220/303; 220/374
[58] Field of Search ............... 220/367, 373, 374, 303, 220/288, 371, 209; 137/493.7, 493.8, 854

[56] References Cited

U.S. PATENT DOCUMENTS

| | | | |
|---|---|---|---|
| 1,459,543 | 6/1923 | McDonald | 220/203 |
| 1,942,630 | 1/1934 | Woodbridge | 220/373 |
| 2,735,964 | 2/1956 | Grieve et al. | 220/371 X |
| 3,071,285 | 1/1963 | Friend | 220/203 |
| 3,189,072 | 6/1965 | Starr | 220/288 R |

Primary Examiner—Allan N. Shoap
Attorney, Agent, or Firm—Michael, Best & Friedrich

[57] ABSTRACT

Disclosed herein is a cap assembly for a fuel tank including a cap having a top wall with a vent opening therethrough, a cylindrical side wall depending from the top wall, a generally cylindrical wall depending from the top wall and inside of the side wall, and defining a recess therein, and an insert in the recess. The insert includes a hollow generally cylindrical member defining a bore having opposite ends, one of the ends being closed and the other of the ends being open and adjacent the top wall with the bore being in fluid communication with the vent opening. The insert also includes an annular flange surrounding the generally cylindrical member intermediate its opposite ends, the flange having a periphery engaging the cylindrical wall, and a hole in the flange for providing fluid communication between the fuel tank and the recess. An aperture extends through the generally cylindrical member in the area between the flange and the end of the bore adjacent the top wall for providing fluid communication between the recess and the bore.

16 Claims, 2 Drawing Figures

FUEL CAP ASSEMBLY

BACKGROUND OF THE INVENTION

This invention relates to fuel caps for use with fuel tanks and more particularly to a fuel cap assembly of the type permitting exhaust of air from the fuel tank through the cap but preventing escape of fuel.

Gasoline engine powered lawn and garden equipment and other small machines employing gasoline engines often have integrally attached fuel tanks. It is desirable to permit venting of such fuel tanks while also preventing escape of liquid fuel entrained in the escaping air.

Examples of prior art caps for use with fuel tanks are found in the following patents:

| | | |
|---|---|---|
| Stranahan | U.S. 1,339,485 | May 11, 1920 |
| Dolezal | U.S. 1,380,045 | May 31, 1921 |
| Martin | U.S. 1,509,969 | September 30, 1924 |
| Hautzenroeder et al | U.S. 2,739,731 | March 27, 1956 |
| Thompson | U.S. 2,849,147 | August 26, 1958 |
| Friend | U.S. 3,067,907 | December 11, 1962 |
| Crute | U.S. 3,938,692 | February 17, 1976 |
| Evans | U.S. 3,985,260 | October 12, 1976 |
| West German Auslegeschrift | 1,233,681 | |

Other examples of prior art caps for use in capping receptacles and for permitting venting of air while preventing escape of liquid from the receptacle are shown in the following patents:

| | | |
|---|---|---|
| Arnold | U.S. 112,674 | March 14, 1871 |
| Shutt et al | U.S. 3,077,283 | February 12, 1963 |
| Sabatino | U.S. 3,253,963 | May 31, 1966 |
| Lindenberg | U.S. 3,385,467 | May 28, 1968 |
| Bell et al | U.S. 3,506,497 | April 14, 1970 |

SUMMARY OF THE INVENTION

The invention provides a cap assembly for a fuel tank including a cap having a top wall and a vent opening therethrough, a cylindrical side wall depending from the top wall, a generally cylindrical inner wall depending from the top wall and inside and concentric with the side wall, the cylindrical wall defining a recess therein, and an insert positioned in the recess. The insert includes a hollow generally cylindrical member defining a bore having opposite ends, one of the opposite ends being closed and the other of the opposite ends being opened and positioned adjacent the top wall of the cap with the bore in fluid communication with the vent opening. The insert also includes an annular flange surrounding the generally cylindrical member intermediate the opposite ends, the flange having a periphery engaging the cylindrical wall, and a hole in the flange for providing fluid communication between the fuel tank and the recess. An aperture extends through the generally cylindrical member in the area between the flange and the end of the bore adjacent the top wall for providing fluid communcation between the chamber and the bore.

According to one embodiment of the invention, the cap assembly further includes a baffle secured to the cylindrical member adjacent the closed end of the cylindrical member, and the baffle includes a flexible generally circular disc positionable in the neck of the fuel tank, and the circular disc and the annular flange defining a cavity therebetween.

One of the principal features of the invention is the provision of a flange having an annular frusto-conical configuration tapering outwardly of the member and away from the top wall to the flange periphery, and the hole being located adjacent the flange periphery.

Another of the principal features of the invention is that the cap includes a second cylindrical wall extending downwardly from the top wall and surrounding the open end of the generally cylindrical member, and the second cylindrical wall is integrally connected to the top wall.

A further principal feature of the invention is that the aperture comprises a slot in the cylindrical member adjacent the top wall.

An additional principal feature of the invention is that the inner cylindrical wall has a lower edge comprising a lip, the lip having a periphery smaller than the periphery of the flange and the periphery of the flange is positioned on the lip.

Another principal feature of the invention is that the cylindrical wall has an outside surface diverging outwardly of the cylindrical inner wall and toward the top wall, and the side wall has a threaded interior surface opposite the outside surface of the cylindrical inner wall.

In accordance with one embodiment of the invention the cap is comprised of plastic material.

Other features and advantages of the embodiments of the invention will become apparent to those skilled in the art upon reviewing the following detailed description, the drawing and the appended claims.

Figure 1:
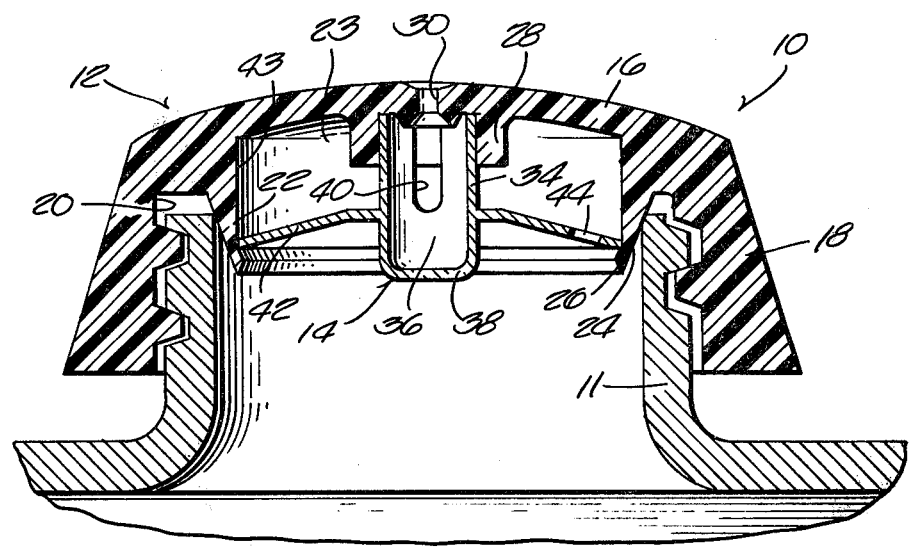
FIG. 1 is a side elevation cross-section view of the fuel tank cap of the invention, the cap being threadably attached to the neck of a fuel tank.

Before explaining the embodiments of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

A fuel tank cap assembly 10 is shown in FIG. 1 attached in threaded relationship to the neck 11 of a fragmentarily shown gasoline tank. The fuel cap assembly 10 is generally intended to provide an air vent for the fuel tank and also to prevent liquid fuel from coming through the fuel cap during normal operation of a gasoline driven device receiving fuel from the fuel tank. The fuel cap assembly 10 generally includes a passage to permit air to pass through the cap, but preventing escape of liquid fuel.

The fuel tank cap assembly 10 is generally comprised of a cap 12 and an insert 14 held inside the cap 12. The cap 12 may be constructed from metal or a plastic material and includes a top wall 16 and a cylindrical side wall 18 depending from the periphery of the top wall 16. The interior surface 20 of the cylindrical side wall 18 is threaded such that the cap 12 can be threadably joined to the neck 11 of the fuel tank. The cap 12 further includes an inner cylindrical wall 22 integral with and extending downwardly from the top wall 16, the inner cylindrical wall 22 being disposed internally of the side wall 18 and concentric therewith and defining a recess 23. The outside surface 24 of the cylindrical wall 22 diverges outwardly and toward the top wall 16 and is intended to be received in sealing engagement against the lip of the fuel tank neck 11. The lower circumferential portion of the cylindrical wall 22 defines an inwardly extending lip 26 having a diameter smaller than the diameter of the inside surface of the remainder of the cylindrical wall 22.

The cap 12 further includes a centrally located cylindrical wall 28 projecting downwardly from the top wall 16 concentrically with the inner cylindrical wall 22. A vent opening 30 extends through the center of the top wall 16 and is disposed within the cylindrical wall 28.

The insert 14 is positioned within the recess 23 defined by the inner cylindrical wall 22 and includes a generally hollow cylindrical member 34 having a central bore 36 therein, the lower end of the bore 36 being closed by an end wall 38 and the upper end of the bore 36 being open and received within the cylindrical wall 28 and abutting the top wall 16. The open end of the cylindrical member 34 thus surrounds and is in fluid communication with the vent opening 30. The cylindrical member 34 has an outside diameter substantially the same as that of the inside surface of the cylindrical wall 28. Means are also included for providing communication between the bore 36 and the recess 23. While various arrangements can be employed, in the illustrated construction, the member 34 includes at least one slot 40 extending from the end of the member 34 positioned adjacent the top wall 16 along approximately half the length of the member 34.

The insert 14 further includes an annular frusto-conical flange 42 surrounding the cylindrical member 34 and integrally attached to the member 34 intermediate its length and below the end of the slot 40.

The annular flange 42 slopes away from the top wall 16 toward its periphery and the periphery is received against the inside cylindrical surface 43 of the inner cylindrical wall 22 and is positioned against the lip 26 whereby the insert is restrained in the recess 23 defined by the cylindrical wall. The lip 26 may also include a plurality of inwardly extending projections to further restrain the insert 14.

Means are further included for providing communication between the fuel tank and the recess 23. While various arrangements can be employed, in the illustrated construction, an air flow aperture 44 extends through the annular flange 42 adjacent its periphery to permit air flow from the fuel tank into the recess 23.

A continuous air flow path is provided by the aperture 44 into the recess 23, through slot 40 into the central bore 36, and from the central bore 36 through the vent opening 30 to the atmosphere. Any liquid fuel entrained in the tortuous air flow path so provided will impinge on one of the surfaces presented and will drain back into the fuel tank through aperture 44.

Figure 2:
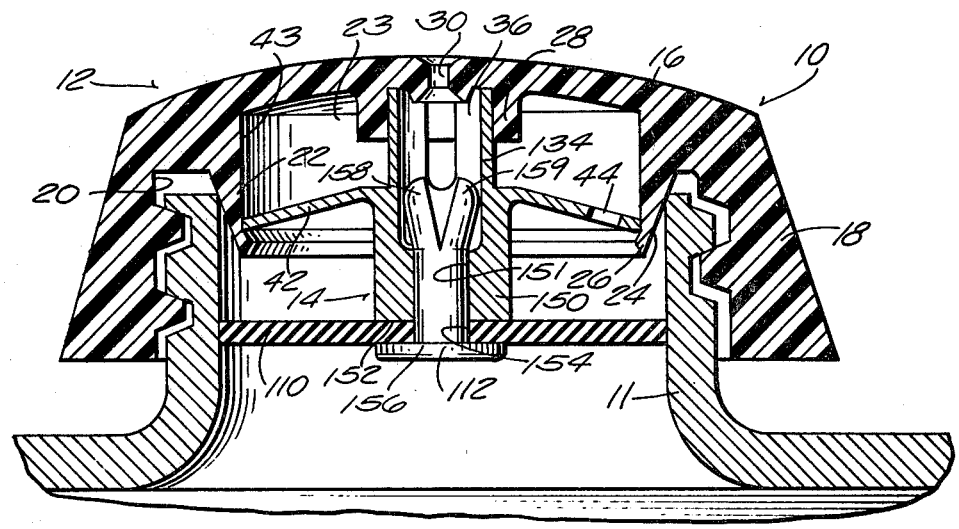
FIG. 2 is a view similar to FIG. 1 but showing an alternative embodiment of the fuel tank cap of the invention.

An alternative embodiment of the fuel tank cap of the invention is shown in FIG. 2. The components of the construction shown in FIG. 2 which are similar to those of the construction shown in FIG. 1 are identified with the same reference numerals. A description of these components in detail is not believed necessary in view of the foregoing description with respect to FIG. 1.

The fuel tank cap shown in FIG. 2 differs from that shown in FIG. 1 in that a baffle 110 is attached by means of a fastener 112 to the lower end of a hollow cylindrical member 134, the baffle 110 intended to be received within the fuel tank neck 11 to prevent liquid fuel from splashing up into the fuel tank cap. The baffle 110 is comprised of a flexible washer having an outside diameter substantially equal to the inside diameter of the fuel tank neck 11 and intended to be slideably received in the fuel tank neck. The baffle is comprised of flexible material such that the periphery of the baffle can deform to allow vaporized fuel and air to escape through the fuel tank cap in the event of a vapor pressure increase in the fuel tank. In a preferred embodiment of the invention, the baffle is comprised of rubber but other flexible, elastic or resilient materials could also be used.

The hollow cylindrical member 134 is similar to the hollow cylindrical member 34 shown in FIG. 1 but differs therefrom by including a downwardly extending cylindrical body portion 150 extending downwardly from the annular flange 42. The cylindrical body 150 includes a central vertical bore 151 communicating with the bore 36 and includes a bottom end 152 supporting the baffle 110.

The baffle 110 is secured to the bottom end 152 of the cylindrical body 150 by a fastener 112 extending through a central bore 154 in the baffle 110 and into the bore 151. An annular flange 156 surrounds the lower end of the fastener 112 and is positioned against the lower surface of the baffle 110. The upper end of the fastener 112 extends through the bore 154 into the bore 36 and is split into two outwardly diverging sections 158 and 159 to thereby prevent removal of the fastener.

The baffle 110 and the annular flange 42 surrounding the cylindrical member 34 form an annular chamber therebetween surrounding the cylindrical member 134. In the event pressure builds up in the fuel tank, the baffle will deform permitting flow of air and vaporized fuel into the annular chamber and through the aperture 44 into recess 23. The air and vaporized fuel will then flow through slot 40 into bore 36 and then through bore 30 to the atmosphere.

Various of the features of the invention are set forth in the following claims.

What is claimed is:

1. A cap assembly for a fuel tank having a neck, the cap assembly comprising a cap including a top wall having a vent opening therethrough, a cylindrical side wall depending from said top wall, a generally cylindrical inner wall depending from said top wall and inside of and concentric with said side wall, said cylindrical inner wall defining a recess therein, and an insert in said recess, said insert including a hollow generally cylindrical member defining a bore having opposite ends, one of said ends being closed and the other of said ends being open and positioned adjacent said top wall with said bore in fluid communication with said vent opening, an annular flange extending from said generally cylindrical member intermediate said ends, said flange having a periphery, said flange periphery engaging said cylindrical inner wall, and a hole in said flange for providing fluid communication between the fuel tank and the recess, and an aperture through said generally cylindrical member in the area between said flange and said other of said ends for providing fluid communication between said recess and said bore.

2. A cap assembly as set forth in claim 1 wherein said flange has an annular frusto-conical configuration and tapers outwardly of said member and away from said top wall to said flange periphery and wherein said hole is located adjacent said flange periphery.

3. A cap assembly as set forth in claim 1 and further including a second cylindrical wall extending downwardly from said top wall and surrounding said open end of said generally cylindrical member, said second cylindrical wall being integrally connected to said top wall.

4. A cap assembly as set forth in claim 1 wherein said aperture comprises a slot in said cylindrical member.

5. A cap assembly as set forth in claim 1 wherein said inner cylindrical wall has a lower edge comprising a lip, said lip having a periphery smaller than said flange periphery and wherein said flange periphery is positioned on said lip.

6. A cap assembly as set forth in claim 1 wherein said inner cylindrical wall has an outside surface diverging outwardly of said inner cylindrical wall and toward said top wall and wherein said side wall has a threaded interior surface opposite said outside surface.

7. A cap assembly as set forth in claim 1 wherein said cap is comprised of plastic material.

8. A cap assembly as set forth in claim 1 and further including a baffle secured to said cylindrical member adjacent said one of said ends, and said baffle including a generally circular disc positionable in said neck, said circular disc and said annular flange defining a cavity therebetween, and means for securing said baffle to said cylindrical member.

9. A cap assembly as set forth in claim 8 wherein said circular disc is flexible and includes a periphery engaging said neck.

10. A cap assembly for a fuel tank comprising a cap including a top wall having a vent opening therethrough and a periphery, a cylindrical side wall depending from said periphery, a generally cylindrical inner wall depending from said top wall and inside of and concentric with said side wall, said cylindrical inner wall defining a recess therein, an insert in said recess, said insert including a hollow generally cylindrical member defining a bore having opposite ends, one of said ends being closed and the other of said ends being open and positioned adjacent said top wall with said bore in fluid communication with said vent opening, an annular frusto-conical flange extending from said generally cylindrical member intermediate said ends, said flange having a periphery, said flange tapering outwardly of said member and away from said top wall and said flange periphery engaging said cylindrical inner wall, and a hole in said flange located adjacent said flange periphery for providing fluid communication between the fuel tank and the recess, a slot through said generally cylindrical member in the area between said flange and said other end for providing fluid communication between said recess and said bore, and a second cylindrical wall extending downwardly from said top wall and surrounding said open end of said generally cylindrical member said second cylindrical wall being integrally connected to said top wall, said inner cylindrical wall having a lower edge comprising a lip, said lip having a periphery smaller than said flange periphery and wherein said flange periphery is positioned on said lip, said inner cylindrical wall having an outside surface diverging outwardly of said inner cylindrical wall and toward said top wall and said side wall having a threaded interior surface opposite said outside surface.

11. A cap assembly for a fuel tank having a neck, the cap assembly comprising a cap including a top wall having a vent opening therethrough, a cylindrical side wall depending from said top wall, a generally cylindrical inner wall depending from said top wall and inside of and concentric with said side wall, said cylindrical inner wall defining a recess therein, and an insert in said recess, said insert including a hollow member defining a bore having opposite ends, one of said ends being closed and the other of said ends being open and positioned adjacent said top wall with said bore in fluid communication with said vent opening, an annular flange extending from said hollow member intermediate said ends, said flange having a periphery, said flange periphery engaging said cylindrical inner wall, and a hole in said flange for providing fluid communication between the fuel tank and the recess, and an aperture through said hollow member in the area between said flange and said other of said ends for providing fluid communication between said recess and said bore.

12. A cap assembly as set forth in claim 11 wherein said flange has an annular frusto-conical configuration and tapers outwardly of said hollow member and away from said top wall to said flange periphery and wherein said hole is located adjacent said flange periphery.

13. A cap assembly as set forth in claim 11 and further including a second cylindrical wall extending downwardly from said top wall and surrounding said open end of said hollow member, said second cylindrical wall being integrally connected to said top wall.

14. A cap assembly as set forth in claim 11 wherein said cylindrical inner wall has a lower edge comprising a lip, said lip having a periphery smaller than said flange periphery and wherein said flange periphery is positioned on said lip.

15. A cap assembly as set forth in claim 11 wherein said inner cylindrical wall has an outside surface diverging outwardly of said inner cylindrical wall and toward said top wall and wherein said side wall has a threaded interior surface opposite said outside surface.

16. A cap assembly as set forth in claim 11 and further including a baffle secured to said hollow member adjacent said one of said ends, and said baffle including a generally circular disc positionable in said neck, said circular disc and said annular flange defining a cavity therebetween, and means for securing said baffle to said hollow member.

* * * * *